(12) United States Patent
Beck et al.

(10) Patent No.: US 10,759,125 B2
(45) Date of Patent: Sep. 1, 2020

(54) METHOD FOR PRODUCING FIBER-REINFORCED PLASTIC COMPONENTS

(71) Applicant: Bayerische Motoren Werke Aktiengesellschaft, Munich (DE)

(72) Inventors: Juergen Beck, Mainburg (DE); Daniel Heim, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 285 days.

(21) Appl. No.: 15/684,233

(22) Filed: Aug. 23, 2017

(65) Prior Publication Data
US 2017/0348925 A1 Dec. 7, 2017

Related U.S. Application Data

(63) Continuation of application No. PCT/EP2016/051064, filed on Jan. 20, 2016.

(30) Foreign Application Priority Data

Mar. 9, 2015 (DE) .......................... 10 2015 204 142

(51) Int. Cl.
| | | |
|---|---|---|
| B29C 70/68 | (2006.01) | |
| B29C 70/54 | (2006.01) | |

(Continued)

(52) U.S. Cl.
CPC ............ B29C 70/68 (2013.01); B29C 70/202 (2013.01); B29C 70/30 (2013.01); B29C 70/34 (2013.01);
(Continued)

(58) Field of Classification Search
CPC ....... B29C 70/34; B29C 70/386; B29C 70/42; B29C 70/504; B29C 70/02
See application file for complete search history.

(56) References Cited

U.S. PATENT DOCUMENTS

| | | | | |
|---|---|---|---|---|
| 5,269,863 A | * | 12/1993 | Middelman | B29C 70/16 |
| | | | | 156/176 |
| 2007/0175571 A1 | * | 8/2007 | Rubin | B29C 70/525 |
| | | | | 156/196 |

(Continued)

FOREIGN PATENT DOCUMENTS

| | | |
|---|---|---|
| DE | 42 18 434 A1 | 12/1993 |
| DE | 195 37 737 A1 | 4/1997 |

(Continued)

OTHER PUBLICATIONS

German Search Report issued in counterpart German Application No. 10 2015 204 142.5 dated Jul. 24, 2015 with partial English-language translation (ten (10) pages).

(Continued)

*Primary Examiner* — Jacob T Minskey
*Assistant Examiner* — Virak Nguon
(74) *Attorney, Agent, or Firm* — Crowell & Moring LLP (57) ABSTRACT

Disclosed is a method for producing components from fiber-reinforced thermoplastic on the basis of fiber tapes impregnated with matrix material. The method includes manufacturing a multitude of semi-finished products, each of which has a plurality of non-consolidated layers of fiber tapes. The semi-finished products are placed in a consolidation device in such a way that the semi-finished products are in direct contact with one another. The semi-finished products are then consolidated using the consolidation device and the semi-finished products are at least partially joined to one another during the consolidation process. The joined semi-finished products are then cut apart using a cutting device.

15 Claims, 4 Drawing Sheets

(51) Int. Cl.
  *B29C 70/20* (2006.01)
  *B29C 70/30* (2006.01)
  *B29C 70/42* (2006.01)
  *B29C 70/50* (2006.01)
  *B29C 70/34* (2006.01)
  *B29C 70/38* (2006.01)
  *B29K 101/12* (2006.01)
  *B29K 105/08* (2006.01)
  *B29K 627/18* (2006.01)

(52) U.S. Cl.
  CPC ............ *B29C 70/386* (2013.01); *B29C 70/42* (2013.01); *B29C 70/504* (2013.01); *B29C 70/545* (2013.01); *B29K 2101/12* (2013.01); *B29K 2105/0872* (2013.01); *B29K 2627/18* (2013.01)

(56) References Cited

U.S. PATENT DOCUMENTS

| 2011/0088538 A1 | 4/2011 | Bechtold |
| 2011/0111168 A1 | 5/2011 | Duqueine et al. |
| 2012/0295062 A1* | 11/2012 | Szasz ............... B29C 70/545 428/137 |
| 2013/0234358 A1 | 9/2013 | Mildner et al. |
| 2014/0186600 A1* | 7/2014 | Dyksterhouse ........ D03D 15/00 428/220 |
| 2016/0136913 A1* | 5/2016 | Hannig ................. E04F 15/04 52/588.1 |
| 2016/0257794 A1* | 9/2016 | Grimm ..................... C08J 5/10 |

FOREIGN PATENT DOCUMENTS

| DE | 10 2008 010 228 A1 | 9/2009 |
| DE | 10 2010 056 239 A1 | 4/2012 |
| DE | 10 2012 004 826 A1 | 9/2013 |

OTHER PUBLICATIONS

International Search Report (PCT/ISA/210) issued in PCT Application No. PCT/EP2016/051064 dated Apr. 19, 2016 with English-language translation (five (5) pages).

German-language Written Opinion (PCT/ISA/237) issued in PCT Application No. PCT/EP2016/051064 dated Apr. 19, 2016 (five (5) pages).

* cited by examiner

Fig. 8

METHOD FOR PRODUCING FIBER-REINFORCED PLASTIC COMPONENTS

CROSS REFERENCE TO RELATED APPLICATIONS

This application is a continuation of PCT International Application No. PCT/EP2016/051064, filed Jan. 20, 2016, which claims priority under 35 U.S.C. § 119 from German Patent Application No. 10 2015 204 142.5, filed Mar. 9, 2015, the entire disclosures of which are herein expressly incorporated by reference.

BACKGROUND AND SUMMARY OF THE INVENTION

A method for producing fiber-reinforced plastic components is provided, in particular a method for producing components from thermoplastic fiber-reinforced plastic, formed from fiber tapes that are impregnated with a matrix material.

Fiber-reinforced plastic components have a structure from reinforcement fibers, wherein the structure from reinforcement fibers is embedded in a plastic matrix material. A multi-layer fiber structure having fiber directions which are disposed so as to be tailored to requirements in terms of load as far as possible is often required for comparatively complex components of a comparatively high grade. Impregnated thermoplastic fiber tapes are used as the primary material for the production mentioned. Such fiber tapes are usually composed of a single-layer tape-shaped basic fiber structure which is already impregnated with the required matrix material. Such fiber tapes are available as material on rolls, for example. A possibility for producing such impregnated fiber tapes is described in publication DE 42 18 434 A1, for example.

It is known for multi-layer rectangular sheets which serve as semi-finished products for further processing to be produced from impregnated fiber tapes of this type. Publication US 2011/0111168 A1 describes how multi-axial planar sheets which have a strength that is as direction-independent as possible and which can be stored and further processed at a later point in time can be made from such fiber tapes.

According to the prior art, the semi-finished products are further processed by static pressing in a batch process, wherein the sheets for consolidation are in each case placed individually into a press. This has the disadvantage that the throughput of sheets produced in a unit of time drops. Furthermore, the sheets according to the prior art are conveyed in and out only manually.

It is an object to be achieved by one or more embodiments to provide a method for producing components from thermoplastic fiber-reinforced plastic, formed from impregnated fiber tapes, by means of which method the throughput of the semi-finished products during consolidation can be increased, and by means of which method time and/or costs can thus be saved.

This and other objects are achieved by a method according to embodiments of the invention.

According to one embodiment, in the case of a method for producing components from thermoplastic fiber-reinforced plastic, a multiplicity of semi-finished products which each have a plurality of non-consolidated layers of fiber tapes impregnated with a matrix material are produced. The semi-finished products preferably each have a plurality of layers of fiber tapes, wherein a multiplicity of fiber tapes that are disposed beside one another are disposed in each layer, wherein the fiber tapes within one layer can be oriented in an identical or dissimilar manner. The fiber tapes preferably have a single-layer tape-shaped basic fiber structure from fibers, wherein the basic fiber structure is impregnated with a matrix material. The fiber tapes can also be referred to as UD tapes.

The fibers of fiber tapes of neighboring layers within a semi-finished product can be oriented in a dissimilar manner, for example. Preferably, the fiber tapes are initially interconnected only by localized connections such as, for example, spot welds. The semi-finished products are thus available as non-consolidated semi-finished products. That is to say, the individual layers of the semi-finished products, prior to the consolidation process, are not interconnected across the entire area thereof. The semi-finished products here and hereunder can also be referred to as layups. Furthermore, the individual non-consolidated semi-finished products are preferably available in a singularized form, that is to say that the semi-finished products are not interconnected.

The fibers of the impregnated fiber tapes are preferably uni-directional endless fibers. The fibers can be carbon fibers, glass fibers, aramid fibers, basalt fibers, or natural fibers, for example. The matrix material is preferably a thermoplastic material, for example PEEK, PEKK, PP, PE, PPS, TPE, or a polyamide.

After the multiplicity of semi-finished products have been produced, the semi-finished products are disposed in a consolidation installation in such a manner that the semi-finished products are in direct mutual contact. In other words, the semi-finished products after being disposed in the consolidation installation contact one another at least partially. In particular, each semi-finished product after being disposed in the consolidation installation should be in direct contact with at least one further semi-finished product. Preferably, with the exception of the first and the last semi-finished product that are disposed in the consolidation installation, all further semi-finished products are in direct contact with two other semi-finished products, wherein the two other semi-finished products contact the respective semi-finished product on two mutually opposite sides. The throughput of the semi-finished products during consolidation can be advantageously increased by the arrangement within the consolidation installation as has been described.

After the semi-finished products have been disposed in the consolidation installation, the semi-finished products are consolidated by means of the consolidation installation, wherein the semi-finished products during consolidation are at least partially interconnected. For example, the semi-finished products can bond with one another by virtue of fusing which results from a thermal input by the consolidation installation, for example.

After the consolidation procedure, the interconnected semi-finished products are separated by means of a separation device. After separation, the semi-finished products thus are again present in a singularized form. The separation device can be embodied as a cutter, a circular cutter, a scissor device, a laser, an ultrasonic blade, or an oscillating blade, for example.

According to a further embodiment, the semi-finished products during consolidation are moved through a multiplicity of heating zones within the consolidation installation in a continuous or quasi-continuous process. For example, the consolidation installation can be configured as a combined pressing and heating installation, in particular as a dual-belt press or an interval heating press, respectively. The consolidation installation preferably has two endless belts and the semi-finished products during consolidation are guided through the individual heating zones between the two endless belts. The endless belts are preferably from steel. Alternatively, the endless belts can also include polytetrafluoroethylene, or can be composed of polytetrafluoroethylene. The consolidation installation preferably has a multiplicity of heating zones. The heating zones herein preferably have dissimilar temperatures. For example, the consolidation installation can include a first heating zone which has a temperature of approximately 100° C., a second heating zone which has a temperature of approximately 380° C., and a third heating zone which has a temperature of approximately 60° C. The first, the second, and the third heating zones are preferably disposed in a directly sequential manner, wherein the second heating zone is disposed between the first and the third heating zones.

According to a further embodiment, the disposing of the semi-finished products in the consolidation installation is carried out in a fully automated manner. For example, one or a plurality of robots can grip the semi-finished products and dispose the latter in the consolidation installation. The consolidation installation can have an infeed unit, for example, which can be configured as a conveyor belt, for example, and which can infeed the semi-finished products to the actual pressing and heating installation. The robot or robots, respectively, can grip the semi-finished products by means of vacuum suction pads or needle grippers, for example, and place the semi-finished products into the consolidation installation or the infeed unit of the consolidation installation, respectively. Precise and repetitively accurate disposing of the semi-finished products can be performed by means of the automated handling.

According to a further embodiment, prior to consolidation, in each case one or a plurality of external insert elements are disposed between two directly neighboring semi-finished products. The external insert elements in each case in terms of the shape thereof are preferably adapted to the directly neighboring semi-finished products. For example, two semi-finished products that are disposed so as to be in direct mutual contact can configure a gap in which one or a plurality of external insert elements can be disposed. It may be in particular that the mutually disposed semi-finished products have partially curved lateral faces such that it is impossible for the semi-finished products to be disposed having direct mutual contact in such a manner that a gap between the semi-finished products can be avoided. Problems such as a loss in pressure by virtue of gaps between the semi-finished products, for example, that arise during consolidation can be prevented by the disposing of one or a plurality of external insert elements. The external insert elements preferably have a spacing from the semi-finished products of at most 5 mm. Alternatively, the external insert elements can contact directly the semi-finished products. The external insert elements preferably have a thickness which differs from the thickness of the semi-finished products by at most 1.5 mm, wherein the thickness of the semi-finished products is understood to be the extent of the semi-finished products perpendicular to the disposal direction of the individual layers of fiber tapes.

According to a further embodiment, the semi-finished products have a frame shape having at least one clearance. The clearance preferably extends from a surface of a semi-finished product to the opposite surface of the semi-finished product. The clearance is laterally delimited preferably on all sides by the non-consolidated fiber tapes of a semi-finished product. According to a preferred embodiment, prior to consolidation of the semi-finished products, in each case one internal insert element is disposed in the clearances of the semi-finished products. On account thereof, it can be achieved that semi-finished products that are provided with clearances can also be consolidated, since there is no longer the risk during the consolidation procedure of the pressure that is created during consolidation dropping as a result of the process. Moreover, a saving in terms of material can be achieved by producing consolidated semi-finished products having clearances, since frame-shaped semi-finished products can be produced without inboard regions having to be cut out from the semi-finished products after a consolidation procedure.

According to a further embodiment, the internal insert elements are disposed in the clearances in a fully automated manner. For example, the internal insert elements can be disposed in the clearances by means of one or a plurality of robots. The robot or robots, respectively, can have vacuum suction pads or needle grippers, for example, or other gripping elements, by way of which the internal insert elements can be gripped and positioned in the clearances. Precise and repetitively accurate inserting of the internal insert elements can be advantageously achieved by way of the automated handling by means of one or a plurality of robots.

According to a further embodiment, the internal insert elements are removed from the clearances after consolidation of the semi-finished products. The removing of the internal insert elements can be performed prior to or after separation of the semi-finished products that due to the consolidation procedure are interconnected, for example. The removing of the internal insert elements from the clearances is preferably carried out by means of one or a plurality of robots in a fully automated process.

According to a further embodiment, the internal insert elements are fixedly connected to a belt of the consolidation installation. For example, the internal insert elements can be fixedly connected to an endless belt of the consolidation installation, or to an endless belt of the dual-belt press, respectively. The internal insert elements can be welded to the belt of the consolidation installation, for example. In the case of this embodiment, the semi-finished products can be retrieved from the consolidation installation after the consolidation procedure in such a manner that the semi-finished products are retrieved from the endless belt, for example in a fully automated process by means of one or a plurality of robots. As a result, the clearances of the semi-finished products are free of the internal insert elements, and the internal insert elements remain fastened to the endless belt of the consolidation installation.

According to a further embodiment, the internal insert elements in terms of the shape and/or size thereof are adapted to the respective clearances. Preferably, the internal insert elements after being disposed in the clearances have on all sides a spacing from the semi-finished products of at most 5 mm. The internal insert elements preferably have a thickness that differs from the thickness of the semi-finished products by at most 1.5 mm.

According to a further embodiment, the internal insert elements and/or external insert elements are configured as insert sheets or as insert panels, respectively. For example, the internal insert elements and/or the external insert elements can comprise polytetrafluoroethylene or another high-temperature resistant thermoplastic material, or be composed thereof. Alternatively, the internal insert elements and/or external insert elements can comprise aluminum, an aluminum alloy, rubber, or silicone, or be composed of aluminum, an aluminum alloy, rubber, or silicone.

According to a further embodiment, at least one semi-finished product has a plurality of inboard clearances, wherein, prior to consolidation, in each case at least one internal insert element is disposed in each of the clearances.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A to 7 are schematic illustrations of selected method steps of the method described herein for producing components from thermoplastic fiber-reinforced plastic, formed from fiber tapes, according to various exemplary embodiments.

DETAILED DESCRIPTION OF THE DRAWINGS

Identical or equivalent component parts can be provided with the same reference sign in each of the exemplary embodiments and figures. In principle, the elements illustrated and the mutual size ratios thereof are not to be considered as being to scale. Rather, for the sake of improved clarity and/or understanding, individual elements can be illustrated so as to be exaggerated in thickness or in dimensional size.

FIGS. 1A to 1D show various method steps of the method described herein for producing fiber-reinforced plastic components. Two semi-finished products 1 which each have a plurality of non-consolidated layers of fiber tapes 2 are produced in the step shown in FIG. 1A. Each semi-finished product 1 comprises a multiplicity of layers of fiber tapes 2, wherein a plurality of fiber tapes 2 are disposed beside one another in an identical or dissimilar orientation in each layer. The semi-finished products 1 are illustrated in a plan view perpendicular to the individual layers of fiber tapes 2. The semi-finished products 1, after the production thereof, are not interconnected, but are available in a singularized form.

Figure 1A:
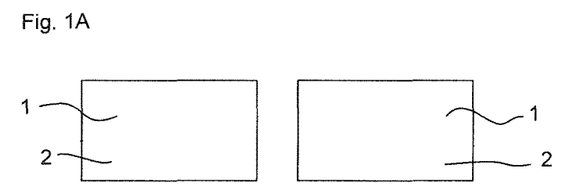
Figure 1B:
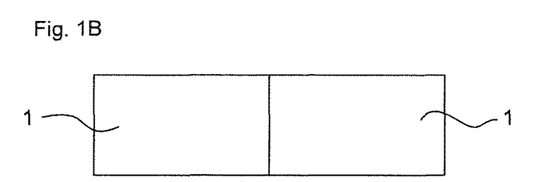
Figure 8:
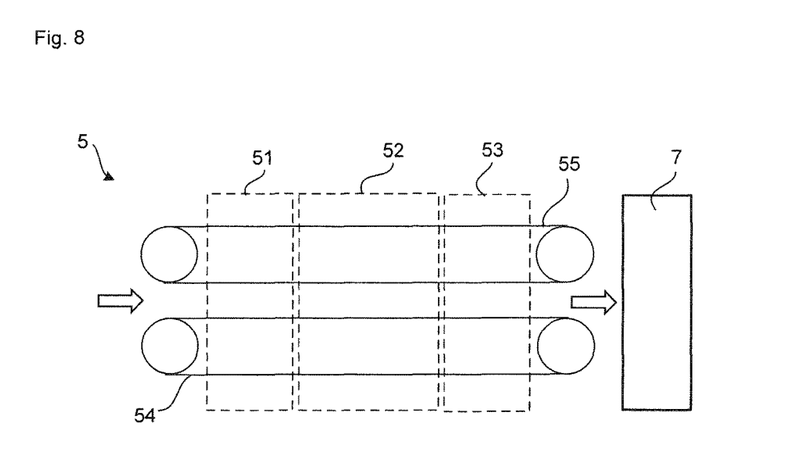
FIG. 8 is a schematic illustration of a consolidation installation in the form of a dual-belt press according to a further exemplary embodiment.

In a method step shown in FIG. 1B, the semi-finished products 1 are disposed in a consolidation installation 5 such as is shown in FIG. 8, for example, in such a manner that the semi-finished products 1 are in direct mutual contact. For example, the semi-finished products 1 can be disposed in the consolidation installation 5, or on an infeed unit of the consolidation installation 5, respectively, by means of one or a plurality of robots such that the semi-finished products 1 contact one another. In order for the semi-finished products 1 to be gripped, the robot or robots, respectively, can be equipped with one or a plurality of gripping units, for example, such as a vacuum suction pad or a needle gripper, for example.

Figure 1C:
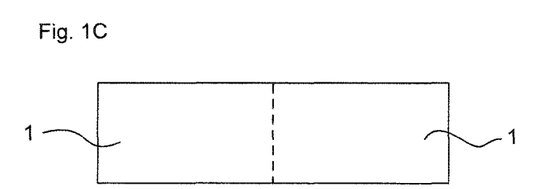

In a method step shown in FIG. 1C that follows the method step of FIG. 1B, the semi-finished products 1 are consolidated by means of the consolidation installation 5, wherein the semi-finished products 1 during the consolidation procedure are at least partially interconnected. The consolidation installation can be configured as a combined pressing and heating installation, for example. A connection between the semi-finished products that are disposed beside one another can be established during the consolidation procedure, for example, by virtue of at least partial fusing of the semi-finished products 1 by virtue of a thermal input.

Figure 1D:
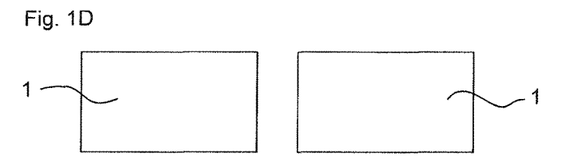

The interconnected semi-finished products 1 are subsequently separated by means of a separation device 7 which can follow the consolidation installation 5. After separation of the semi-finished products 1, the semi-finished products 1 are again available in a singularized form, that is to say, the semi-finished products 1 after the separation procedure by means of the separation device 7 are no longer interconnected. The separation device 7 can be configured as a cutter, a circular cutter, scissors, a laser, an ultrasonic blade, or as an oscillating blade, for example.

Figure 2:
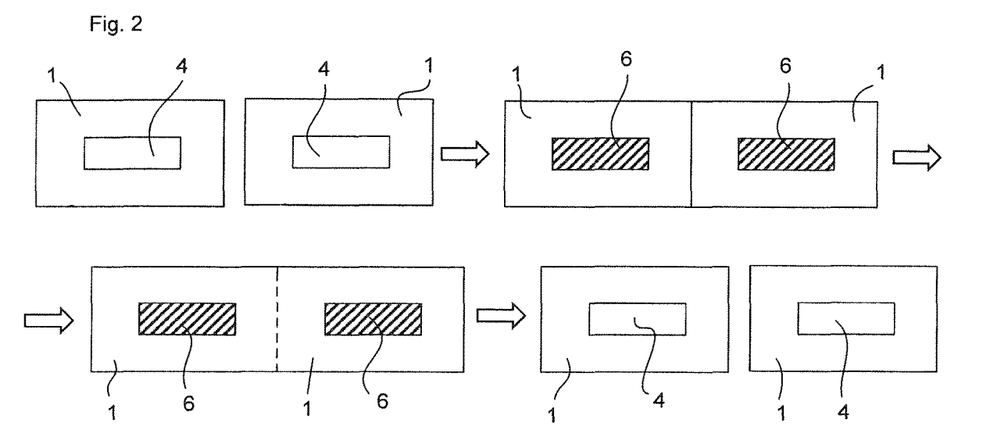

A method as described herein according to a further embodiment is illustrated in FIG. 2. By contrast to the exemplary embodiments illustrated in FIGS. 1A to 1D, the non-consolidated semi-finished products 1 after the production thereof have a frame shape. The semi-finished products 1 have a clearance 4 which extends from a surface of the respective semi-finished product 1 to the opposite surface. Prior to consolidation of the semi-finished products 1 by means of the consolidation installation 5, in each case one internal insert element 6 is disposed in the clearances 4. The disposing of the internal insert elements 6 in the clearances 4 can be carried out by means of one or a plurality of robots, for example. It can be advantageously achieved by means of the internal insert elements 6 that frame-shaped semi-finished products 1 can also be consolidated without the pressure drop that is created during consolidation and caused by the process during the consolidation procedure.

The internal insert elements 6 in the exemplary embodiment shown are composed of Teflon. Alternatively, the internal insert elements 6 can also be produced from aluminum, for example. The internal insert elements 6 are preferably adapted to the respective clearances 4. It is, in particular, preferable for the internal insert elements 6 in terms of the shape, size, and/or number thereof to be adapted to the clearances 4 of the semi-finished products 1. For example, the internal insert elements 6 in the lateral direction have a spacing from the semi-finished products 1 of at most 5 mm.

Figure 3:
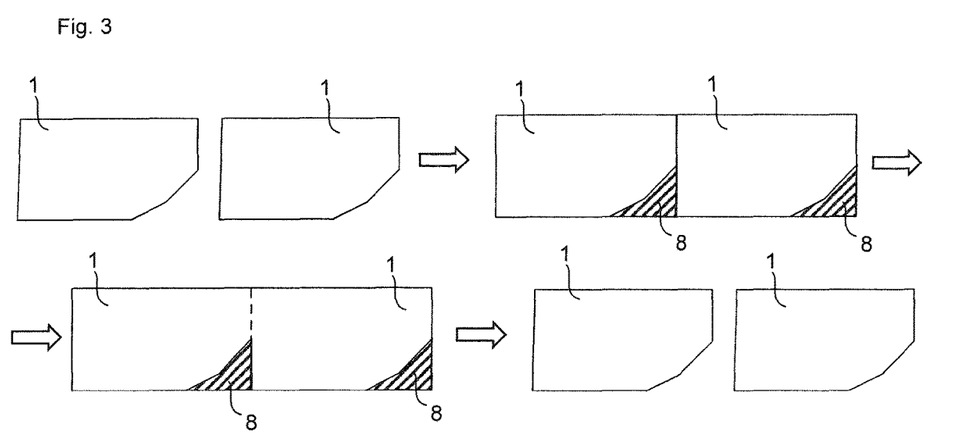

FIG. 3 shows method steps of the method described herein according to a further exemplary embodiment. By contrast to the exemplary embodiment shown in FIGS. 1A to 1D, the non-consolidated semi-finished products 1 after the production thereof have an external shape that does not permit the semi-finished products 1 to be disposed beside one another in such a manner that no gap is created between two semi-finished products that are disposed beside one another. The semi-finished products 1 in the exemplary embodiment illustrated have a lateral face having one or multiple curvatures.

The semi-finished products 1, prior to consolidation of the semi-finished products 1 by means of the consolidation installation 5, are disposed so as to be in direct mutual contact, and external insert elements 8 are disposed between two directly neighboring semi-finished products 1. The external insert elements 8 in terms of the shape and size thereof are preferably adapted to that of the directly neighboring semi-finished products. By means of the external insert elements 8, semi-finished products of any external contour can advantageously be consolidated in a continuous consolidation process.

Figure 4:
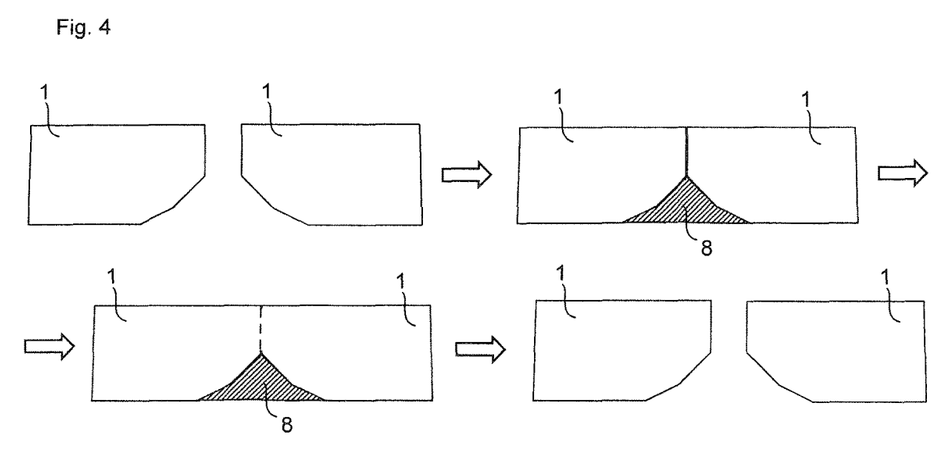

The method steps that are shown in the context of FIG. 4 differ from the exemplary embodiment shown in FIG. 3 in that two provided non-consolidated semi-finished products 1 are mutually disposed in such a manner that the irregular external contours thereof are mutually opposite. The semi-finished products 1 are again mutually disposed in such a manner that they are in direct mutual contact. An external insert element 8 is disposed between the semi-finished products 1. The method shown in FIG. 4 has the advantage that in a continuous consolidation process, external insert elements 8 do not have to be disposed between all neighboring semi-finished products 1, since the semi-finished products 1 are positioned in such a manner that the irregular external contours thereof are in each case mutually opposite, on the one hand, and the regular external contours thereof are in each case likewise mutually opposite, on the other hand.

Figure 5:
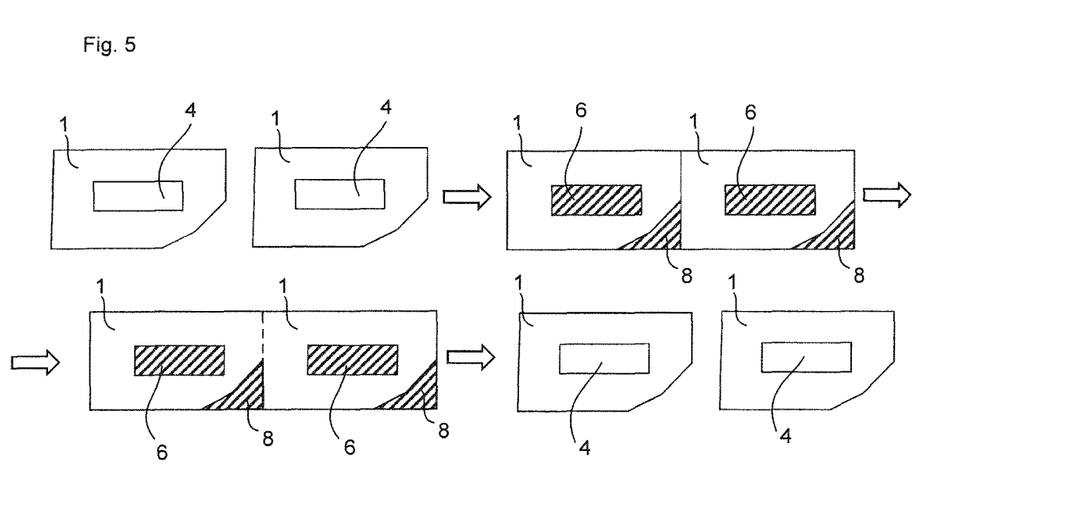

FIG. 5 shows method steps of the method described herein according to a further exemplary embodiment. By contrast to the exemplary embodiment shown in FIG. 3, the non-consolidated semi-finished products 1 after the production thereof each have one clearance 4 in which, prior to consolidation, in each case one internal insert element 6 is disposed. The internal insert elements 6 can be configured as has been explained in the context of FIG. 2, for example.

Figure 6:
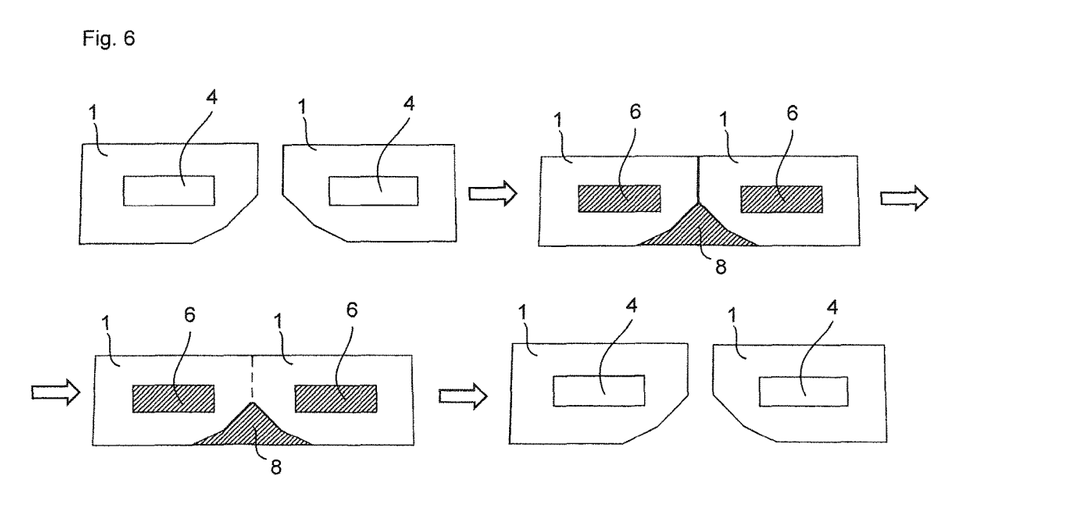

A further exemplary embodiment of the method described herein for producing components from thermoplastic fiber-reinforced plastic, formed from impregnated fiber tapes, is illustrated in FIG. 6. By contrast to the exemplary embodiment shown in FIG. 4, the non-consolidated semi-finished products 1 after the production thereof each have one clearance 4. In each case, one internal insert element 6 is disposed in the clearances 4 prior to consolidation. The internal insert elements 6 can again be configured as has been described above in the context of FIG. 2.

Figure 7:
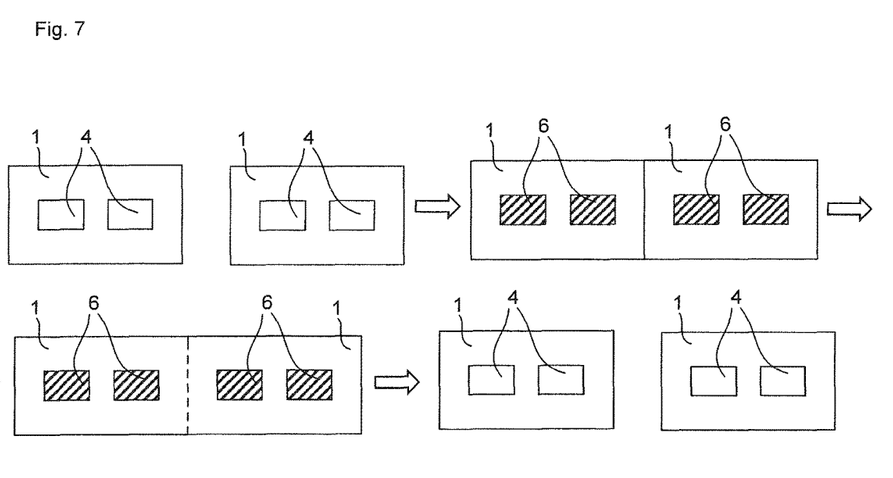

FIG. 7 shows method steps of the method described herein according to a further exemplary embodiment, wherein, by contrast to the method described in FIG. 2, the non-consolidated semi-finished products 1 after the production thereof have a plurality of clearances 4 which in each case extend from a surface of a semi-finished product to the opposite surface. Prior to consolidation of the semi-finished products, in each case at least one internal insert element 6 is disposed in the clearances. Semi-finished products having a plurality of clearances can be advantageously consolidated by means of the method described herein.

A consolidation installation 5 which is configured as a dual-belt press having an integrated heating and pressing function is illustrated in FIG. 8. The dual-belt press has two belts 54, 55 which are embodied as endless belts and by means of which the semi-finished products 1 can be pressed in a continuous process and moved through a multiplicity of heating zones 51, 52, 53. The heating zones 51, 52, 53 preferably each have dissimilar temperatures. For example, the first heating zone 51 can have a temperature of 100° C., the second heating zone 52 can have a temperature of 380° C., and the third heating zone 53 can have a temperature of 60° C. After consolidation by means of the consolidation installation 5, the consolidated and interconnected semi-finished products 1 can be singularized by means of the separation device 7.

According to further exemplary embodiments, the features described in the exemplary embodiments shown can also be combined with one another. Alternatively or additionally, the exemplary embodiments shown in the figures can have further features according to the exemplary embodiments of the general description.

LIST OF REFERENCE NUMERALS

1 Semi-finished product
2 Fiber tape
3 Frame shape
4 Clearance
5 Consolidation installation
51, 52, 53 Heating zone
54, 55 Belt
6 Internal insert element
7 Separation device
8 External insert element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing components from thermoplastic fiber-reinforced plastic, formed from fiber tapes that are impregnated with a matrix material, the method comprising the steps of:
    producing a multiplicity of semi-finished products, each having a plurality of non-consolidated layers of the fiber tapes;
    disposing the semi-finished products in a consolidation installation in such a manner that the semi-finished products are in direct mutual contact;
    disposing internal insert elements within clearances extending between opposite surfaces of an adjacent pair of the semi-finished products in direct mutual contact;
    disposing an external insert element between irregular contours of two directly adjacent surfaces of the adjacent pair of the semi-finished products;
    consolidating the semi-finished products in the consolidation installation by heating the semi-finished products in a first heating zone having a first temperature, then heating the semi-finished products in a second heating zone having a second temperature, and then heating the semi-finished products in a third heating zone having a third temperature, the first temperature being below the second temperature and above the third temperature, the semi-finished products being at least partially interconnected during the step of consolidating the semi-finished products;
    retrieving the semi-finished products so that the adjacent pair of the semi-finished products are free of the internal and external insert elements; and
    subsequently severing the interconnected semi-finished products by means of a separation device.

2. The method according to claim 1, wherein the step of consolidating the semi-finished products includes moving the semi-finished products through the heating zones in a continuous process.

3. The method according to claim 2, wherein the step of disposing the semi-finished products is carried out in a fully automated manner.

4. The method according to claim 1, wherein the step of disposing the semi-finished products is carried out in a fully automated manner.

5. The method according to claim 1, wherein the external insert elements in terms of the shape and/or size thereof are adapted to the two directly adjacent surfaces.

6. The method according to claim 5, wherein the semi-finished products each have a frame shape.

7. The method according to claim 1, wherein the semi-finished products each have a frame shape.

8. The method according to claim 7, wherein the step of disposing the internal insert elements is carried out in a fully automated manner.

9. The method according to claim 7, wherein the internal insert is elements are fixedly connected to a belt of the consolidation installation.

10. The method according to claim 9, wherein the belt of the consolidation installation is an endless belt of the consolidation installation.

11. The method according to claim 7, wherein the internal insert elements in terms of the shapes and/or sizes thereof are adapted to the corresponding clearances.

12. The method according to claim 7, wherein each of the internal insert elements after being disposed in the corresponding clearance has on all sides a spacing from an adjacent semi-finished product of at most 5 mm.

13. The method according to claim 7, wherein each of the internal insert elements includes polytetrafluoroethylene or is composed of polytetrafluoroethylene.

14. The method according to claim 1, wherein the consolidation installation is configured as a combined pressing and heating installation.

15. The method according to claim 1, wherein the consolidation installation is configured as a dual-belt press.

* * * * *